US009062959B2

(12) United States Patent
Wang et al.

(10) Patent No.: US 9,062,959 B2
(45) Date of Patent: Jun. 23, 2015

(54) WAVELENGTH SCANNING INTERFEROMETER AND METHOD FOR ASPHERIC SURFACE MEASUREMENT

(71) Applicant: ZHEJIANG UNIVERSITY, Hangzhou (CN)

(72) Inventors: Kaiwei Wang, Hangzhou (CN); Jian Bai, Hangzhou (CN); Yibing Shen, Hangzhou (CN); Yongying Yang, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 14/245,996

(22) Filed: Apr. 4, 2014

(65) Prior Publication Data

US 2014/0218750 A1 Aug. 7, 2014

Related U.S. Application Data

(63) Continuation of application No. PCT/CN2012/072659, filed on Mar. 21, 2012.

(30) Foreign Application Priority Data

Mar. 15, 2012 (CN) .......................... 2012 1 0067757

(51) Int. Cl.
*G01B 11/02* (2006.01)
*G01B 9/02* (2006.01)
(Continued)

(52) U.S. Cl.
CPC ........ *G01B 9/02041* (2013.01); *G01B 11/2441* (2013.01); *G01B 9/02039* (2013.01); *G01M 11/005* (2013.01)

(58) Field of Classification Search
CPC .... G01B 9/02; G01B 11/2441; G01B 11/306; G01B 11/303; G01J 9/02
USPC ........................................................ 356/512
See application file for complete search history.

(56) References Cited

U.S. PATENT DOCUMENTS 7,397,570 B2   7/2008   Kawasaki et al. ............. 356/512
2002/0160672 A1  10/2002  Hattori et al. ................... 440/89
(Continued)

FOREIGN PATENT DOCUMENTS

CN   10-141927 A   5/1998
CN   2000-97669 A  4/2000
(Continued)

OTHER PUBLICATIONS

Hou, Xi et al., "Study on the measurement of large-aperture aspheric surfaces with snnular sub-aperture scanning method" Opto-Electronic Engineering, vol. 31, No. 9, Sep. 2004, pp. 26-28.
(Continued)

*Primary Examiner* — Tarifur Chowdhury
*Assistant Examiner* — Md Rahman
(74) *Attorney, Agent, or Firm* — J.C. Patents (57) ABSTRACT

The present invention discloses a wavelength scanning interferometer and a method for an aspheric surface measurement. The wavelength scanning interferometer comprises a set of tunable lasers (7) used as a light source, a Twyman-Green interferometer used for generating interference fringes, a translation platform (1) used for scanning an optical path difference along an optical axis, an image card (11) used for converting interference data to a digital signal and transmitting the digital signal to a computer (12), and a data card (13) used for synchronizing the actions of a CCD camera (9) and the translation platform (1). Different from the traditional aspheric surface measurement method, the interferometer is capable of measuring a surface with a high aspheric surface degree or a wavefront, and without the need of a zero compensation mirror. In addition, the method does not need a complex and usually expensive multi-dimensional movement platform.

4 Claims, 4 Drawing Sheets (51) Int. Cl.
*G01B 11/24* (2006.01)
*G01M 11/00* (2006.01)

(56) References Cited

U.S. PATENT DOCUMENTS

| 2005/0157311 | A1 | 7/2005 | Kuchel | 356/513 |
| 2008/0043226 | A1* | 2/2008 | Hayashi et al. | 356/73 |
| 2008/0204322 | A1* | 8/2008 | Oswald et al. | 342/465 |
| 2010/0110446 | A1* | 5/2010 | Kuchel | 356/512 |
| 2011/0013196 | A1* | 1/2011 | Aoki | 356/498 |

FOREIGN PATENT DOCUMENTS

| CN | 1995943 | A | 7/2007 |
| CN | 200950056 | Y | 9/2007 |
| CN | 101290218 | A | 10/2008 |
| CN | 101876540 | A | 11/2010 |
| CN | 102155926 | A | 8/2011 |
| CN | 102589416 | B | 5/2014 |
| JP | 2000-146541 | A | 5/2000 |

OTHER PUBLICATIONS

Jing, Minjuan, "The Study of Wavelength Scanning Interference Testing Method for Aspherical Surface" Chinese Selected Doctoral Dissertations and Master's Thesis Full-Text Databases (Master), No. 1, Mar. 15, 2003.

Lang, Zhiguo, "Study on Measuring Large Aperture Aspheric Surface Technique Based on Ultra-Precise Rotary Scanning" Science-Engineering, Chinese Doctoral Disserations Full-Text Database, No. 4, Apr. 15, 2011.

Yu, Jie , "The Study of Laser Wavelength Scanning Interference Testing Method for Aspherical Surface" Electronic Technology & Information Science, China Master's Thesis Full-Text Database, No. 7, Jul. 15, 2009.

International Search Report of corresponding International Application No. PCT/CN2012/072659, dated Dec. 6, 2012.

Chinese First Examination Report of corresponding Chinese Application No. 201210067757.3, dated Jul. 26, 2013.

* cited by examiner

WAVELENGTH SCANNING INTERFEROMETER AND METHOD FOR ASPHERIC SURFACE MEASUREMENT

CROSS-REFERENCE TO RELATED APPLICATIONS

This application is a continuation of International Application No. PCT/CN2012/072659, filed on Mar. 21, 2012, which claims priority to Chinese Patent Application No. 201210067757.3, filed on Mar. 15, 2011, both of which are hereby incorporated by reference in their entireties.

FIELD OF THE INVENTION

The present invention relates to a high-accuracy interference measurement technology for an aspheric surface, and in particular to a wavelength scanning interferometer and a method for measurement of an aspheric surface.

BACKGROUND

Compared with the traditional optical system using a plurality of spherical surface components, aspheric surfaces are capable of keeping corresponding performances while effectively simplifying the structure of the system, thus being widely used. By using the aspheric surfaces, the components of the optical system usually can be fewer in number and lighter in weight. For this reason, the aspheric surfaces are widely applied in the fields of ultraviolet lithography, high-quality imaging systems, astronomical telescopes, high-density photomemory and the like.

Various methods and corresponding instruments exist in the field of aspheric surface measurement at present. Such instruments include profilers and coordinate measurement machines based on a contact stylus method, interferometers based on subaperture stitching, shearing interferometers, white-light scanning interferometers, interferometers based on zero compensation and partial zero compensation, interferometers based on computer-generated holography, double-wavelength interferometers, and the like. Compared with the aspects of high accuracy, flexibility requirements and the like of the existing aspheric surface measurement, the methods have some problems in measurement capacity and accuracy.

The profilers and coordinate measurement machines based on the contact pin method are time-consuming in measurement and have a risk of damaging the measured surfaces because of adopting a point-by-point contact measurement method; the interferometers based on subaperture stitching need a high-accuracy multi-dimensional rotary translation platform, and perform stitching and obtain the morphology of the whole measured surface by virtue of the overlapped area data of adjacent sub-apertures; the shear interferometers can introduce accumulative measurement errors while performing surface shape reconstruction on a slope integral because of usually measuring the slope information of the measured surface; and the interferometers using computer-generated holography and a zero compensation lens may have errors introduced by compensation components. The existing methods aforementioned have shortages in the aspects of measurement time, measurement accuracy, additional zero lens, clamp, universality, cost and the like.

The patent (US20020160672) discloses a method for measuring the surface shape of an aspheric surface and a wavefront by using a mechanical scanning interferometer. According to the patent, light at other positions is filtered out and prevented from entering into a detector to generate interference in a spatial filtering mode and based on a method for measuring an interference optical path difference from the vertex of the aspheric surface to a tangent line. In order to obtain the surface shape of the whole aspheric surface, according to the patent, a special length measurement interferometer is especially used for measuring the displacement of the measured aspheric surface driven by the translation platform. According to the patent, a point detector is used for measuring an optical path difference, and due to the point-by-point measurement, it takes dozens of minutes to measure a complete surface. The complexity and cost of the system are also increased by using an additional length measurement interferometer, thus reducing the reliability of the measurement to a certain extent.

SUMMARY

The present invention aims at providing a wavelength scanning interferometer and a method for an aspheric surface measurement for overcoming the shortages in the prior art. The wavelength scanning interferometer and the method provided by the present invention have the characteristics of being high in measurement accuracy, suitable for different apertures, high in aspheric surface degree, and without the need of zero compensation components because the absolute optical path difference of the interferometer can be obtained and only the interference data information of the part tangential with the measured surface is obtained every time.

A wavelength scanning interferometer for an aspheric surface measurement comprises a translation platform, a measured aspheric surface, a first mirror group, a light splitter, a beam expander, a tunable laser, an imaging lens, a CCD (charge coupled device) camera, a reference plane mirror, an image card, a computer and a data card, wherein the measured aspheric surface is fixed on the translation platform, the measured aspheric surface, the first mirror group, the light splitter, the imaging lens and the CCD camera are coaxially placed in sequence, the reference plane mirror is arranged at the bottom of the light splitter, the CCD camera, the image card, the computer and the data card are connected in sequence, the beam expander is connected with the tunable laser, and the translation platform and the tunable laser are connected with the data card respectively; a light beam emitted by the tunable laser is expanded by the beam expander to become a parallel light beam, and the wavefront is split into two beams by the light splitter; one beam is incident on the reference plane mirror to become a reference light, and the other beam is focused by the first mirror group and then is incident on the measured aspheric surface, the lights reflected by the reference mirror and the measured aspheric surface are re-superposed on the light splitter to form interference, interference fringes are acquired by the CCD camera after passing through the imaging lens, and encounter optical-electric conversion in the CCD camera and then analogue-digital conversion in the image card, and finally enter into the computer which performs signal processing, so as to obtain an optical path difference and surface shape information.

Further, the wavelength scanning interferometer further comprises a plane mirror, wherein the plane mirror is used for reflecting the parallel light beam expanded by the beam expander to the light splitter.

A wavelength scanning interferometer for the measurement of an aspheric surface comprises a translation platform, a measured aspheric surface, a second mirror group, a light splitter, a beam expander, a tunable laser, an imaging lens, a CCD camera, an image card, a computer and a data card, wherein the measured aspheric surface 2 is fixed on the translation platform, the measured aspheric surface, the second mirror group, the light splitter, the imaging lens and the CCD camera are coaxially placed in sequence, the CCD camera, the image card, the computer and the data card are connected in sequence, the beam expander is connected with the tunable laser, and the translation platform and the tunable laser are connected with the data card respectively; a light beam emitted by the tunable laser is expanded by the beam expander to become a parallel light beam, a part of the parallel light beam is reflected to the second mirror group by the light splitter, no antireflection film is plated on the last surface of the second mirror group, so that a part of the light incident on the last surface is reflected back to the light splitter, and the other part is focused by the second mirror group to be incident on the measured aspheric surface and is reflected back by the measured aspheric surface; the two parts of light are re-superposed on the light splitter to form interference, interference fringes are acquired by the CCD camera after passing through the imaging lens, and encounter optical-electric conversion in the CCD camera and then analogue-digital conversion in the image card, and finally enter into the computer which performs signal processing so as to obtain an optical path difference and surface shape information.

A method for an aspheric surface measurement by applying the wavelength scanning interferometer aforementioned comprises the following steps:

step 1, setting a cat eye position, specifically, adjusting the vertex of the measured aspheric surface to a position superposing with the focus of the measurement light beam of the interferometer, the position Oc is called as a cat eye position, and a superposition criterion is that the interference fringes are fewest;

step 2, scanning the wavelength of a light source, and recording the interference fringes simultaneously to calculate the absolute optical path difference of the cat eye position which is recorded as OPDc;

step 3, moving the measured aspheric surface to a vertex sphere position by the translation table, at the moment, the wave surface of the measurement light beam is superposed with the vertex sphere of the aspheric surface;

step 4, scanning the wavelength of the light source, and recording the interference fringes simultaneously to calculate the absolute optical path difference of the vertex position which is recorded as OPDa; then the distance d between the vertex sphere position and the cat eye position in step 1 is the curvature radius of the vertex sphere of the measured surface: R0=OPDa−OPDc;

step 5, stepwise moving the aspheric surface by the translation platform, scanning the wavelength of the light source and recording the interference fringes simultaneously in every step to calculate the absolute optical path difference of each point until the whole aperture of the aspheric surface is covered, with the movement of the measured aspheric surface, the distance d between the vertex sphere position and the cat eye position gradually increases, the tangential point of the measurement wavefront and the measured aspheric surface is sequentially expanded outwards from the vertex position of the aspheric surface until all the apertures of the aspheric surface are completely measured;

step 6, integrating the measurement results in steps 1-5 to obtain the surface shape information of the aspheric surface.

The present invention has the following beneficial effects: compared with the existing aspheric surface measurement technology, the interference measurement method disclosed by the present invention has the characteristics of being high in accuracy and non-contact, and can be used for measuring the surface or the wavefront of an aspheric surface with a high aspheric surface degree. In addition, the method does not need a complex and usually expensive multi-dimensional rotary translation platform, and compensation components; and the interferometer does not need an additional length measurement interferometer for detecting the displacement of the measured surface due to the capacity of measuring the absolute optical path difference.

BRIEF DESCRIPTION OF THE DRAWINGS

In the figures, the translation platform 1, the measured aspheric surface 2, the first mirror group 3, the light splitter 4, the plane mirror 5, the beam expander 6, the tunable laser 7, the imaging lens 8, the CCD camera 9, the reference plane mirror 10, the image card 11, the computer 12, the data card 13 and the second mirror group 14 are included.

DETAILED DESCRIPTION

The present invention is described in detail as follows according to the figures and embodiments, and the purposes and effects of the present invention become more obvious.

Embodiment 1

Figure 1:
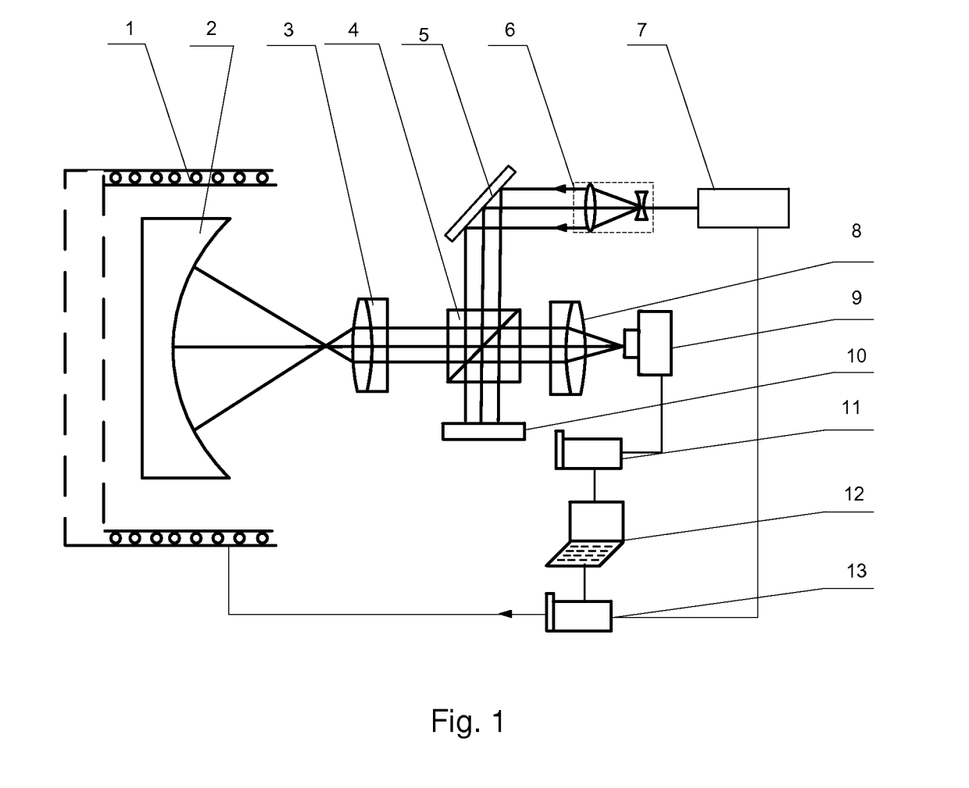
FIG. 1 is the system schematic diagram of the wavelength scanning interferometer for the aspheric surface measurement.

FIG. 1 is the system schematic diagram of the wavelength scanning interferometer for the aspheric surface measurement according to the present invention. As shown in FIG. 1, the wavelength scanning interferometer and the method for the aspheric surface measurement provided by the present invention comprise a translation platform 1, a measured aspheric surface 2, a first mirror group 3, a light splitter 4, a plane mirror 5, a beam expander 6, a tunable laser 7, an imaging lens 8, a CCD camera 9, a reference plane mirror 10, an image card 11, a computer 12 and a data card 13. The measured aspheric surface 2 is fixed on the translation platform 1. The measured aspheric surface 2, the first mirror group 3, the light splitter 4, the imaging lens 8 and the CCD camera 9 are coaxially placed in sequence. The plane mirror 5 and the reference plane mirror 10 are arranged at the bottom and the top of the light splitter 4 respectively. The CCD camera 9, the image card 11, the computer 12 and the data card 13 are connected in sequence. The beam expander 6 is connected with the tunable laser 7, and the translation platform 1 and the tunable laser 7 are connected with the data card 13 respectively.

The more important characteristic of the embodiment is that the tunable laser 7 with a variable wavelength is used for replacing a single-wavelength laser used in the traditional measurement method. A light beam emitted by the tunable laser 7 is expanded by the beam expander 6 to become a parallel light beam. After being reflected by the plane mirror 5, the wavefront is divided into two beams by the light splitter 4. One beam is incident on the reference plane mirror 10 to become a reference light, and the other beam is focused by the first mirror group 3 and then is incident on the measured aspheric surface 2. The lights reflected by the reference mirror 10 and the measured aspheric surface 2 are re-superposed on the light splitter 4 to form interference. Interference fringes are acquired by the CCD camera 9 after passing through the imaging lens 8. The CCD camera 9 performs optical-electric conversion and the image card 11 performs analogue-digital conversion. And finally the computer 12 performs signal processing, so as to obtain an optical path difference and surface shape information. The measured aspheric surface 2 can move along the optical axis under the driving of the translation platform 1. The movement of the translation platform 1 and the wavelength scanning of the tunable laser 7 can be controlled by the computer 12 via the data card 13.

In the interference measurement system, the plane mirror 5 performs an optical path turning effect and can be removed as needed as long as the beam expander 6 and the tunable laser 7 are anticlockwise rotated by 90 degrees.

Embodiment 2

Figure 2:
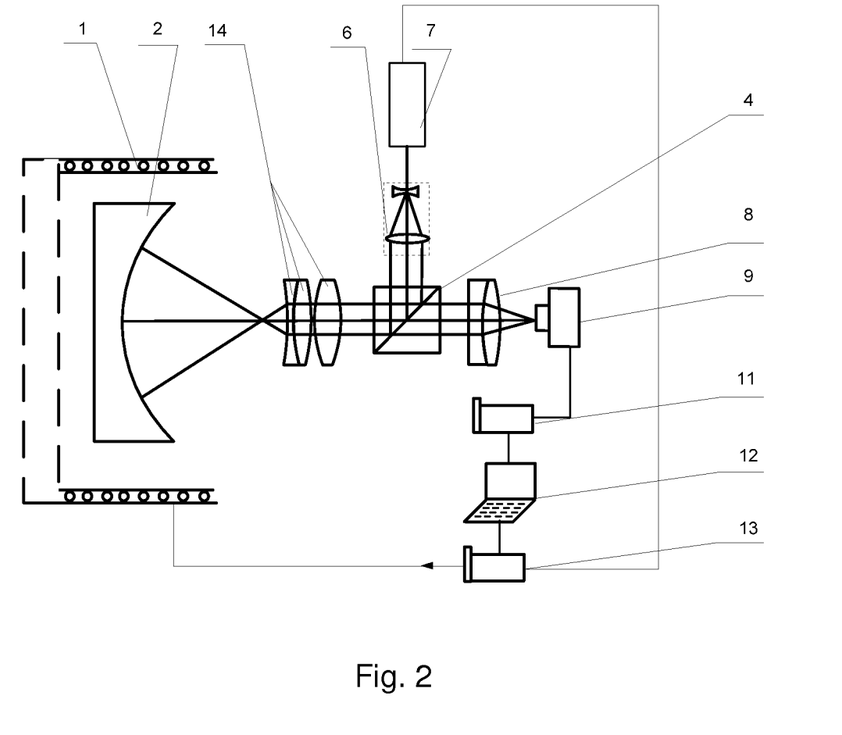
FIG. 2 is the system schematic diagram in another form of the wavelength scanning interferometer for the aspheric surface measurement.

FIG. 2 is another system schematic diagram of the wavelength scanning interferometer in the form of a Fizeau interferometer for the aspheric surface measurement disclosed by the present invention. Different from FIG. 1, a reference light beam is formed by the Fresnel reflection of the last surface (the most left surface of the second mirror group in the figure) of the second mirror group 14. A light beam emitted by the tunable laser 7 is expanded by the beam expander 6 to become a parallel light beam. A part of the parallel light beam is reflected to the second mirror group 14 by the light splitter 4. No antireflection film is plated on the last surface of the second mirror group 14, so that a part of the light incident on the last surface is reflected back to the light splitter 4, and the other part is focused by the second mirror group 14 to be incident on the measured aspheric surface 2 and is reflected back by the measured aspheric surface 2. The two parts of light are re-superposed on the light splitter 4 to form interference. Interference fringes are obtained by the CCD camera 9 after passing through the imaging lens 8. The CCD camera 9 performs optical-electric conversion and the image card 11 performs analogue-digital conversion. And finally the computer 12 performs signal processing, so as to obtain an optical path difference and surface shape information. The measured aspheric surface can move along the optical axis under the driving of the translation platform 1. The movement of the translation platform 1 and the wavelength scanning of the tunable laser 7 can be controlled by the computer 12 via the data card 13.

In the interference measurement system, only two parts of the measured aspheric surface are tangential with the wavefront of an incident light. One part is the vertex of the aspheric surface, the other part is located on some circle of the aspheric surface, and the distance between the circle and the vertex will change with the movement of the measured surface on the optical axis.

Figure 3:
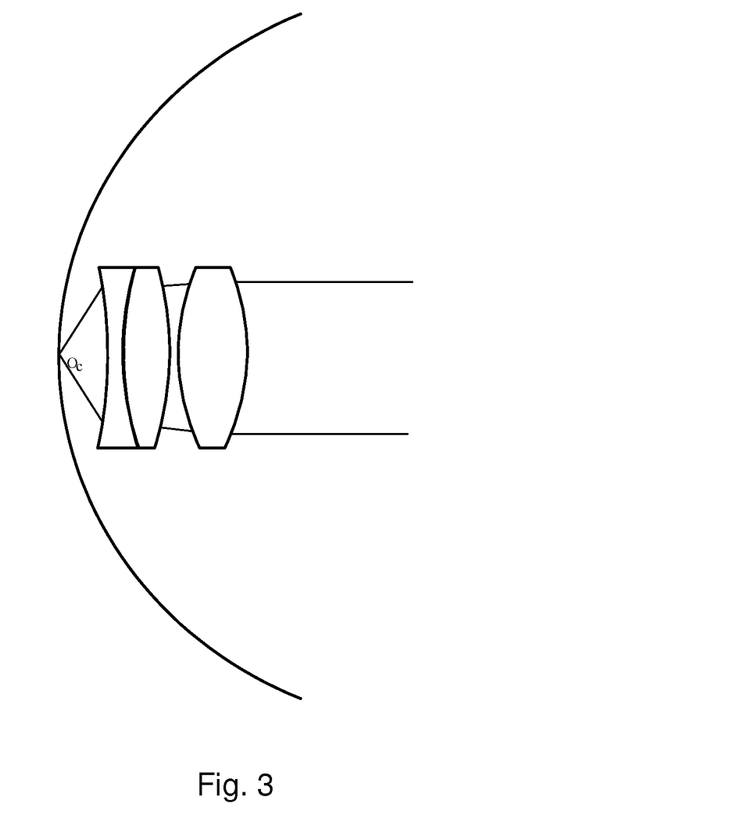
FIG. 3 is the cat eye position during the measurement of the wavelength scanning interferometer for the aspheric surface measurement.
Figure 4:
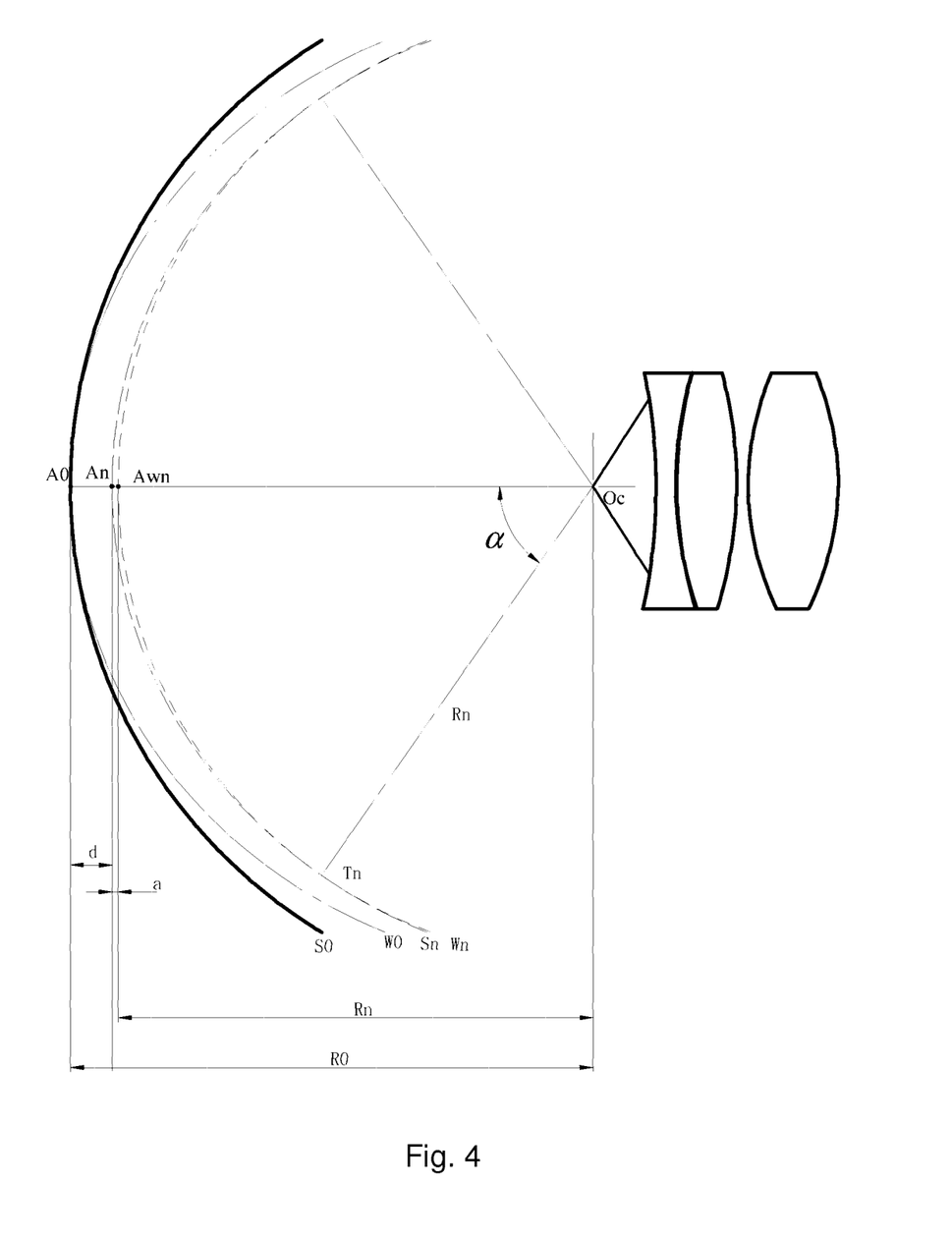
FIG. 4 is the annular belt measurement schematic diagram of the wavelength scanning interferometer for the aspheric surface measurement.

The method for the aspheric surface measurement by applying the wavelength scanning interferometer comprises the following steps:

step 1, setting a cat eye position, specifically, adjusting the vertex of the measured aspheric surface to a position superposing with the focus of the measurement light beam of the interferometer, the position Oc being called as a cat eye position. As shown in FIG. 3, a superposition criterion is that the interference fringes are fewest;

step 2, scanning the wavelength of a light source and recording the interference fringes simultaneously to calculate the absolute optical path difference of the cat eye position which is recorded as OPDc, wherein the calculation method for the optical path difference OPDc is given later;

step 3, moving the measured aspheric surface to a vertex sphere position by the translation table, at the moment, the wave surface of the measurement light beam is superposed with the vertex sphere of the aspheric surface, wherein as shown by the position A0 in FIG. 4, S0 is the surface shape of the aspheric surface, and W0 is the measurement wavefront;

step 4, scanning the wavelength of the light source and recording the interference fringes simultaneously to calculate the absolute optical path difference of the vertex position which is recorded as OPDa, wherein the distance d between the position and the cat eye position in step 1 is the curvature radius of the vertex sphere of the measured surface:

$$R0 = OPDa - OPDc. \quad (1)$$

step 5, as shown in FIG. 4, according to requirements on a measurement resolution ratio, stepwise moving the aspheric surface by the translation platform, scanning the wavelength of the light source and recording the interference fringes simultaneously in every step to calculate the absolute optical path difference of each point, until the whole aperture of the aspheric surface is covered, wherein Sn is the surface shape of the aspheric surface moved to the position in parallel, which is completely the same as the surface shape S0 if the components of the aspheric surface have no deformations; and wherein, with the movement of the measured aspheric surface, the distance d in FIG. 4 gradually increases, the tangential point Tn of the measurement wavefront Wn and the measured aspheric surface Sn is sequentially expanded outwards from the vertex position of the aspheric surface until all the apertures of the aspheric surface are completely measured;

step 6, integrating the measurement results in steps 1-5 to obtain the surface shape information of the aspheric surface.

Without loss of generality, the absolute optical path difference of the interferometer is calculated to be OPDn by wavelength scanning when some position is scanned, then the distance d between the vertex of the aspheric surface at the position and the position A0 aforementioned is:

$$d = OPDa - OPDn. \quad (2)$$

At the moment, the measurement wavefront Wn is tangential with the measured aspheric surface Sn at the tangential point Tn. The interference fringes only located in the vicinity of the tangential point and the vicinity of the vertex An can be resolved by the CCD, and the interference fringes in other places cannot be resolved by the CCD due to high density. Because the light beam in the vicinity of the tangential point Tn goes back the same way, the included angle $\alpha$ between the light beam and the optical axis, as well as the position of the light beam incident on the CCD, can be obtained by demarcating in advance, namely, a corresponding relation exists between a pixel position in the CCD and the included angle $\alpha$. The distance Rn between the point Tn and the focus of the mirror group 3 can be evaluated by the absolute optical path difference OPDtn of the point:

$$Rn = OPDtn - OPDc. \quad (3)$$

The measurement principle of the absolute optical path difference is as follows:

processing of an interference signal: the light intensity detected by some pixel point (x, y) (corresponding to some point (x', y') on the measured aspheric surface) in the CCD can be represented as:

$$I(x,y;k)=a(x,y;k)+b(x,y;k)\cos(2\pi kh(x,y)) \qquad (4)$$

wherein a(x, y, k) and b(x, y, k) represent a background light intensity and the contrast of the interference fringes respectively, k is a wave number, i.e. the reciprocal $1/\lambda$ of a light wavelength, and h(x, y) represents the two-arm optical path difference of the interferometer, the phase $\phi$ (x, y;k) of an interference signal is given by the following formula:

$$\phi(x,y;k)=2\pi kh(x,y), \qquad (5)$$

The number of waves entering in the interferometer can be continuously changed by continuously changing the signal frequency applied to a tunable light filter, and the formula (5) shows that at the moment, the phase of the interference signal is continuously changed:

$$\Delta\phi(x,y;\Delta k)=2\pi\Delta kh(x,y) \qquad (6)$$

The formula shows that the change quantity of the phase is in direct proportion to the change quantity of the wave number, then the evaluated optical path difference h(x, y) can be represented as follows:

$$h(x, y) = \frac{2\pi\Delta\varphi(x, y, \Delta k)}{\Delta k}. \qquad (7)$$

Therefore, what to do is to obtain the phase, and then evaluate the change of the phase.

Without loss of generality, only the phase change of some pixel is considered, and formula (4) can be rewritten as:

$$i(\sigma) = i_0(\sigma) + \frac{1}{2}p(\sigma)\exp[4\pi i\sigma l] + \frac{1}{2}p(\sigma)\exp[-4\pi i\sigma l]. \qquad (8)$$

wherein $\sigma$ is the wave number (which is the reciprocal of the wavelength), $i_0$ ($\sigma$) is a direct-current bias, p($\sigma$) is a signal amplitude, and $\phi 4\pi\sigma l$ is the phase of the interference signal. And a Fourier transform is performed on the formula:

$$I(f)=I_0(f)+P(f-2l)+P(f+2l) \qquad (9)$$

wherein the capital letters are the Fourier spectrums of corresponding small letters. The distributions of the three right terms of the equation are different in a frequency domain. The term P (f−2l) is independently taken out and a Fourier inverse transform is performed on the term to obtain:

$$IFFT(P(f-2l) = \frac{1}{2}p(\sigma)\exp[4\pi i\sigma l], \qquad (10)$$

Logarithm evaluation is performed on the right side of the equation aforementioned to obtain:

$$\log\left\{\frac{1}{2}p(\sigma)\exp[4\pi i\sigma l]\right\} = \log\left[\frac{1}{2}p(\sigma)\right] + i\varphi(\sigma), \qquad (11)$$

wherein the imaginary part in the formula is the measured phase.

Then the value of the absolute optical path difference can be represented by the following formula:

$$l=4\pi\Delta\sigma/\Delta\phi. \qquad (12)$$

wherein $\Delta\sigma$ is the change quantity of the wave number, and $\Delta\phi$ is the change quantity of the phase during frequency scanning.

The invention claimed is:

1. A wavelength scanning interferometer for an aspheric surface measurement, characterized by, comprising a translation platform (1), a measured aspheric surface (2), a first mirror group (3), a light splitter (4), a beam expander (6), a tunable laser (7), an imaging lens (8), a CCD camera (9), a reference plane mirror (10), an image card (11), a computer (12) and a data card (13), wherein the measured aspheric surface (2) is fixed on the translation platform (1), the measured aspheric surface (2), the first mirror group (3), the light splitter (4), the imaging lens (8) and the CCD camera (9) are coaxially placed in sequence, the reference plane mirror (10) is arranged at the bottom of the light splitter (4), the CCD camera (9), the image card (11), the computer (12) and the data card (13) are connected in sequence, the beam expander (6) is connected with the tunable laser (7), and the translation platform (1) and the tunable laser (7) are connected with the data card (13) respectively; a light beam emitted by the tunable laser (7) is expanded by the beam expander (6) to become a parallel light beam with wavefront divided into two beams by the light splitter (4), one beam is incident on the reference plane mirror (10) to become a reference light, and the other beam is focused by the first mirror group (3) and then is incident on the measured aspheric surface (2), the lights reflected by the reference mirror (10) and the measured aspheric surface (2) are re-superposed on the light splitter (4) to form interference; interference fringes are acquired by the CCD camera (9) after passing through the imaging lens (8), and encounter optical-electric conversion in the CCD camera (9) and then analogue-digital conversion in the image card (11), and finally enter into the computer (12) which performs signal processing so as to obtain an optical path difference and surface shape information;

wherein, when in use, wavelengths of a light source are scanned and interference fringes are recorded, so as to calculate an absolute optical path difference of a cat eye position, which is recorded as OPDc, and calculate an absolute optical path difference of a vertex sphere position, which is recorded as OPDa; then distance d between the vertex sphere position and the cat eye position is a curvature radius of the vertex sphere of the measured surface: R0=OPDa−OPDc.

2. The wavelength scanning interferometer for the aspheric surface measurement of claim 1, characterized by, further comprising a plane mirror (5), wherein the plane mirror (5) is used for reflecting the parallel light beam expanded by the beam expander (6) to the light splitter (4).

3. A method for the measurement of an aspheric surface by applying the wavelength scanning interferometer of claim 1, characterized by, comprising the following steps:

step 1, setting a cat eye position, specifically, adjusting a vertex of the measured aspheric surface to a position superposing with a focus of a measurement light beam of the interferometer, the position Oc is called as a cat eye position, and a superposition criterion is that the interference fringes are fewest;

step 2, scanning a wavelength of a light source, and recording the interference fringes simultaneously to calculate an absolute optical path difference of the cat eye position which is recorded as OPDc;

step 3, moving the measured aspheric surface to a vertex sphere position by the translation table, at the moment, a wave surface of the measurement light beam is superposed with the vertex sphere of the aspheric surface;

step 4, scanning the wavelength of the light source and recording the interference fringes simultaneously to calculate an absolute optical path difference of the vertex position which is recorded as OPDa; then distance d between the vertex sphere position and the cat eye position in step 1 is a curvature radius of the vertex sphere of the measured surface: R0=OPDa−OPDc;

step 5, stepwise moving the aspheric surface by the translation platform, scanning the wavelength of the light source and recording the interference fringes simultaneously in every step to calculate an absolute optical path difference of each point until whole aperture of the aspheric surface is covered, with the movement of the measured aspheric surface, the distance d between the vertex sphere position and the cat eye position gradually increases, a tangential point of measurement wavefront and the measured aspheric surface is sequentially expanded outwards from the vertex position of the aspheric surface until all apertures of the aspheric surface are completely measured;

step 6, integrating measurement results in steps 1-5 to obtain the surface shape information of the aspheric surface.

4. A method for the measurement of an aspheric surface by applying the wavelength scanning interferometer of claim 2, characterized by, comprising the following steps:

step 1, setting a cat eye position, specifically, adjusting a vertex of the measured aspheric surface to a position superposing with a focus of a measurement light beam of the interferometer, the position Oc is called as a cat eye position, and a superposition criterion is that the interference fringes are fewest;

step 2, scanning a wavelength of a light source, and recording the interference fringes simultaneously to calculate an absolute optical path difference of the cat eye position which is recorded as OPDc;

step 3, moving the measured aspheric surface to a vertex sphere position by the translation table, at the moment, a wave surface of the measurement light beam is superposed with the vertex sphere of the aspheric surface;

step 4, scanning the wavelength of the light source and recording the interference fringes simultaneously to calculate an absolute optical path difference of the vertex position which is recorded as OPDa; then distance d between the vertex sphere position and the cat eye position in step 1 is a curvature radius of the vertex sphere of the measured surface: R0=OPDa−OPDc;

step 5, stepwise moving the aspheric surface by the translation platform, scanning the wavelength of the light source and recording the interference fringes simultaneously in every step to calculate an absolute optical path difference of each point until whole aperture of the aspheric surface is covered, with the movement of the measured aspheric surface, the distance d between the vertex sphere position and the cat eye position gradually increases, a tangential point of measurement wavefront and the measured aspheric surface is sequentially expanded outwards from the vertex position of the aspheric surface until all apertures of the aspheric surface are completely measured;

step 6, integrating measurement results in steps 1-5 to obtain the surface shape information of the aspheric surface.

* * * * *